US012617505B2

(12) United States Patent
Ono

(10) Patent No.: US 12,617,505 B2
(45) Date of Patent: May 5, 2026

(54) MARINE VESSEL

(71) Applicant: YAMAHA HATSUDOKI KABUSHIKI KAISHA, Iwata (JP)

(72) Inventor: Junya Ono, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 328 days.

(21) Appl. No.: 18/209,586

(22) Filed: Jun. 14, 2023

(65) Prior Publication Data

US 2023/0406465 A1 Dec. 21, 2023

(30) Foreign Application Priority Data

Jun. 15, 2022 (JP) ................................ 2022-096373

(51) Int. Cl.

*B63B 79/40* (2020.01)
*B63B 49/00* (2006.01)
*B63H 21/14* (2006.01)
*B63H 21/21* (2006.01)
*F02D 29/02* (2006.01)
*F02D 41/00* (2006.01)

(52) U.S. Cl.

CPC .............. *B63B 79/40* (2020.01); *B63B 49/00* (2013.01); *B63H 21/14* (2013.01); *B63H 21/21* (2013.01); *F02D 29/02* (2013.01); *F02D 41/0002* (2013.01); *B63H 2021/216* (2013.01)

(58) Field of Classification Search

CPC ......... B63B 79/40; B63B 49/00; B63H 21/14; B63H 21/21; B63H 2021/216; F02D 29/02; F02D 41/0002

See application file for complete search history.

(56) References Cited

U.S. PATENT DOCUMENTS

| | | | | |
|---|---|---|---|---|
| 4,085,473 A * | 4/1978 | Franklin | ................. | B63B 17/04<br>114/364 |
| 2003/0077953 A1* | 4/2003 | Kaji | ...................... | F02B 61/045<br>440/1 |
| 2008/0299847 A1* | 12/2008 | Kaji | ..................... | B63H 21/213<br>440/87 |

FOREIGN PATENT DOCUMENTS

| | | | | |
|---|---|---|---|---|
| JP | 05-85468 A | 4/1993 | | |
| JP | 07-51859 A | 2/1995 | | |
| JP | 07-031593 U | 6/1995 | | |
| JP | 3174157 B2 | 6/2001 | | |
| JP | 2003-237683 A | 8/2003 | | |
| JP | 2016-060475 A | 4/2016 | | |
| WO | WO-2022112542 A1 * | 6/2022 | ......... | G05B 23/0272 |

OTHER PUBLICATIONS

WO2022112542 translation with paragraph numbers (Year: 2022).*

* cited by examiner

*Primary Examiner* — Joan T Goodbody
(74) *Attorney, Agent, or Firm* — Keating & Bennett, LLP

(57) ABSTRACT

A marine vessel that is able to inform a vessel operator that an attachment is attached includes a hull and a controller configured or programmed to function as a judging unit to judge whether or not an attachment that is attachable and detachable to and from the hull is attached to the hull, and to function as a notifying unit to, in a case of being judged by the judging unit that the attachment is attached, execute a notification process to notify the vessel operator that the attachment is attached to the hull.

18 Claims, 10 Drawing Sheets

MARINE VESSEL

CROSS REFERENCE TO RELATED APPLICATIONS

This application claims the benefit of priority to Japanese Patent Application No. 2022-096373 filed on Jun. 15, 2022. The entire contents of this application are hereby incorporated herein by reference.

BACKGROUND OF THE INVENTION

1. Field of the Invention

The present invention relates to a marine vessel including an attachment that is able to be attached and detached to and from the marine vessel.

2. Description of the Related Art

As seen in many small marine vessels, marine vessels, to/from which attachments such as expansion type platforms, wake poles (poles for wakeboards) or tarps are able to be attached/detached, are known. For example, in Japanese Laid-Open Patent Publication (kokai) No. 2003-237683, a simple roof is able to be attached/detached to/from a hull. In addition, in Japanese Laid-Open Patent Publication (kokai) No. H05-085468, an awning is able to be attached/detached to/from a gate located at the rear portion of a hull. Furthermore, marine vessels are also known in which the state of the attachment is able to be changed, for example, between a used state and an unused state (a stored state) (see Japanese Patent No. 3174157 and Japanese Laid-Open Patent Publication (kokai) No. 2016-060475).

However, when the marine vessel is navigating while the attachment is attached to the marine vessel, the feeling during maneuvering of the marine vessel and a navigation performance of the marine vessel may change.

SUMMARY OF THE INVENTION

Preferred embodiments of the present invention provide marine vessels that are each able to inform a vessel operator that an attachment is attached to the marine vessel.

According to a preferred embodiment of the present invention, a marine vessel includes a hull and a controller configured or programmed to function as a judging unit to judge whether or not an attachment attachable and detachable to and from the hull is attached to the hull, and to function as a notifying unit that, in a case of being judged by the judging unit that the attachment is attached, execute a notification process to notify a vessel operator that the attachment is attached to the hull.

According to a preferred embodiment of the present invention, in the case that the judging unit judges that the attachment that is attachable and detachable to and from the hull is attached to the hull, the notifying unit notifies the vessel operator that the attachment is attached to the hull. As a result, it is possible to inform the vessel operator that the attachment is attached to the marine vessel.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
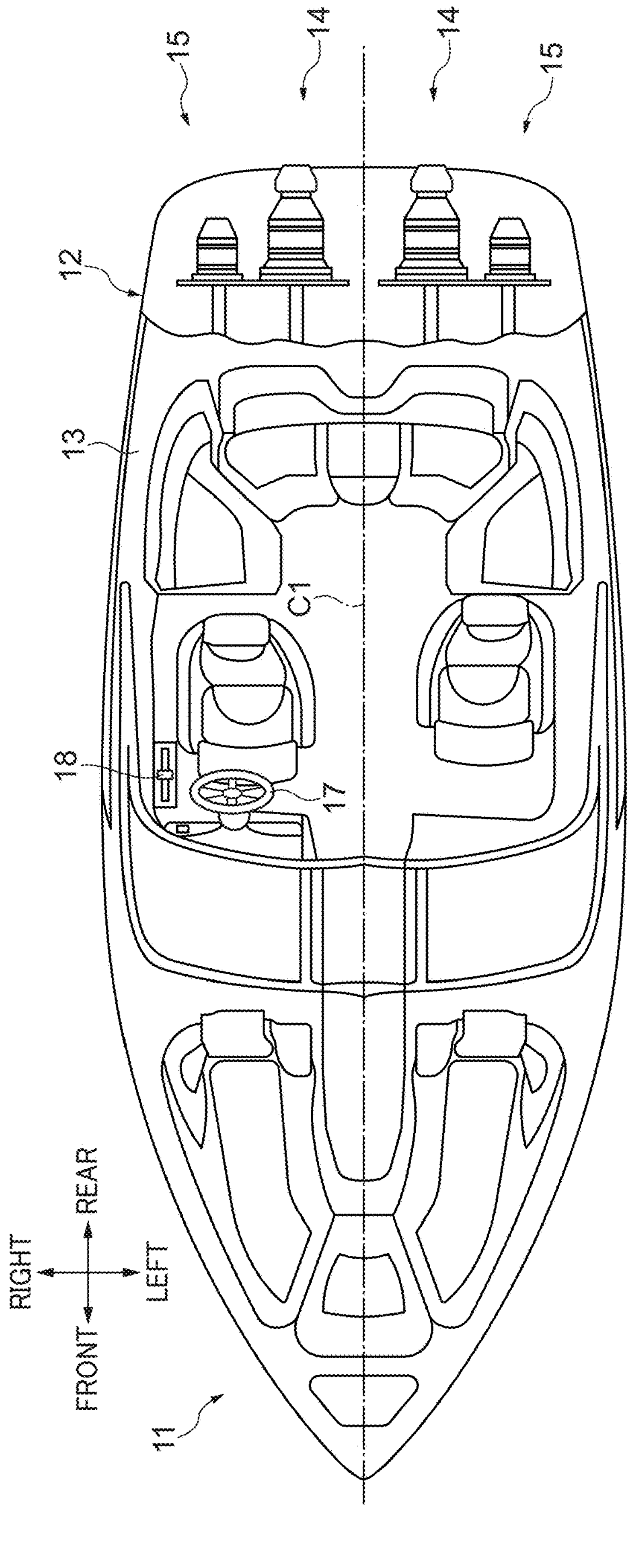
FIG. 1 is a plan view of a marine vessel according to a first preferred embodiment of the present invention.

First, a first preferred embodiment of the present invention will be described. FIG. 1 is a plan view of a marine vessel 11 according to the first preferred embodiment of the present invention. In FIG. 1, a portion of the marine vessel 11 is shown in an exposed view. The marine vessel 11 includes a hull 12 and a deck 13 disposed on an upper portion of the hull 12. The marine vessel 11 is, for example, a water jet propulsion boat.

In the following description, as shown in FIG. 1, front, rear, left, and right directions refer to front, rear, left, and right directions of the hull 12, respectively. The left direction and the right direction are defined with reference to the hull 12 being viewed from the rear. A vertical direction is a direction perpendicular to a front-and-rear direction and a right-and-left direction. Further, the vertical direction is a direction perpendicular to an upper surface of the deck 13.

The marine vessel 11 includes a plurality of propulsion units 14 and 15 to propel the hull 12, a steering handle 17, and an output adjusting unit 18. The steering handle 17 is operated by a marine vessel operator to steer the marine vessel 11. The output adjusting unit 18 includes a lever, etc., and is operated by the marine vessel operator to adjust a thrust and switch a traveling direction. The steering handle 17 and the output adjusting unit 18 are disposed near a maneuvering seat provided on the deck 13. The output adjusting unit 18 is movable in an F region, an N region, and an R region. The N region is between the F region and the R region. The F region makes the marine vessel 11 go forward, and the R region makes the marine vessel 11 go rearward.

The plurality of propulsion units 14 and 15 are propulsion devices to apply the thrust to the hull 12 and are mounted on a rear portion of the hull 12. Each of two first propulsion units 14 uses an engine 34 (see FIG. 6) as a power source (a driving source). Further, each of two second propulsion units 15 uses two or more electric motors M (see FIG. 6) as the power source. All of the first propulsion units 14 and the second propulsion units 15 are jet propulsion units. The propulsion units 14 and 15 are independent of each other.

A pair of the first propulsion units 14 are disposed symmetrically with respect to a vertical plane (a hull center C1) extending through a bow and the center of a stern.

Further, a pair of the second propulsion units 15 are disposed at locations farther from the hull center C1 than the pair of the first propulsion units 14 in a width direction of the hull 12, and are disposed symmetrically with respect to the hull center C1.

The first propulsion unit 14 includes the engine 34 (see FIG. 6), an engine ECU (Electronic Control Unit) (not shown), a jet pump (not shown), and a bucket (not shown). The jet pump is driven by the engine 34, and jets the water, which is sucked in from the bottom of the marine vessel 11, rearward. The bucket moves between a forward position and a reverse position in response to the operation of the output adjusting unit 18, so that a jetting direction from the first propulsion unit 14 is switched, and the direction of the propulsion force generated by the first propulsion unit 14 is switched between a go forward direction and a go rearward direction.

The second propulsion unit 15 includes the electric motors (see FIG. 6), a motor ECU (not shown), and a jet pump (not shown). The electric motors M are controlled by the motor ECU. The jet pump is driven by the electric motors M. The rotation direction of the electric motors M is switched, so that the direction of the propulsion force generated by the second propulsion unit 15 is switched between the go forward direction and the go rearward direction.

Figure 2:
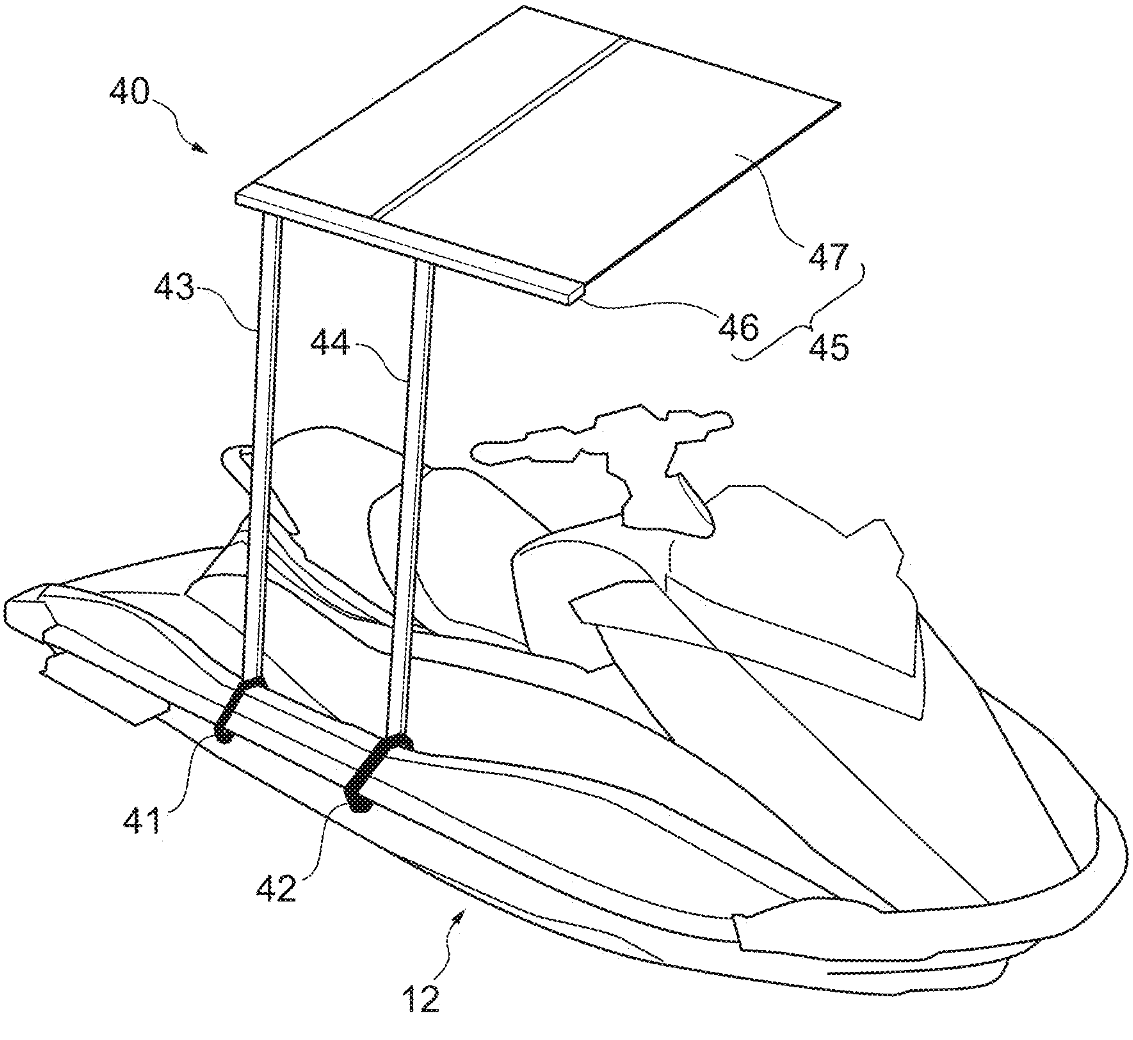
FIG. 2 is a perspective view of a hull in which an attachment is in a used state.
Figure 3:
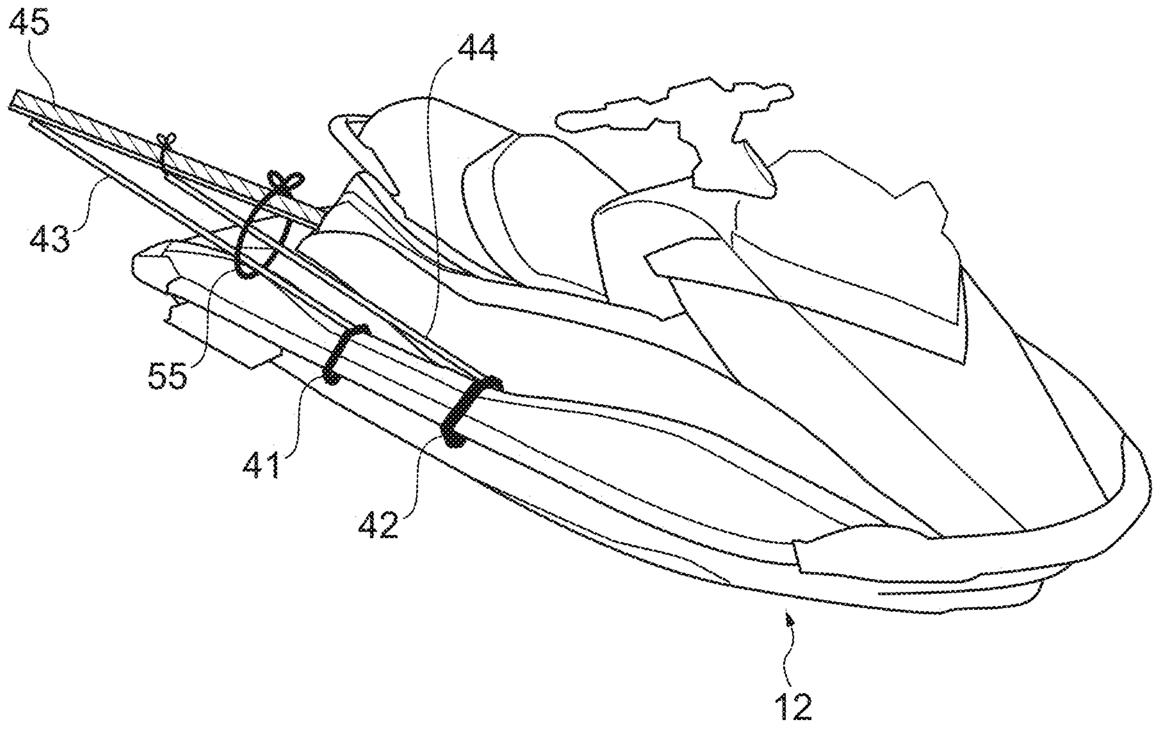
FIG. 3 is a perspective view of the hull in which the attachment is in an attached state.

FIG. 2 and FIG. 3 are perspective views of the hull 12 to which an attachment is attached. In the first preferred embodiment of the present invention, the attachment (an accessory) is attachable and detachable to and from the hull 12. A tarp 40 is illustrated as the attachment. The tarp 40 includes two attachment portions (an attachment portion 41 and an attachment portion 42), two poles (a pole 43 and a pole 44), and a main portion 45. The main portion 45 includes a winding portion 46 and an awning 47. The main portion 45 is a winding type main portion, and the awning 47 is able to be wound around the winding portion 46.

In FIG. 2, the tarp 40 is in "a used state", and in FIG. 3, the tarp 40 is in "an unused state" (a stored state). Generally, in the unused state, a user (the marine vessel operator) bundles the poles 43 and 44 and the main portion 45 with a bundling member 55.

Figure 4:
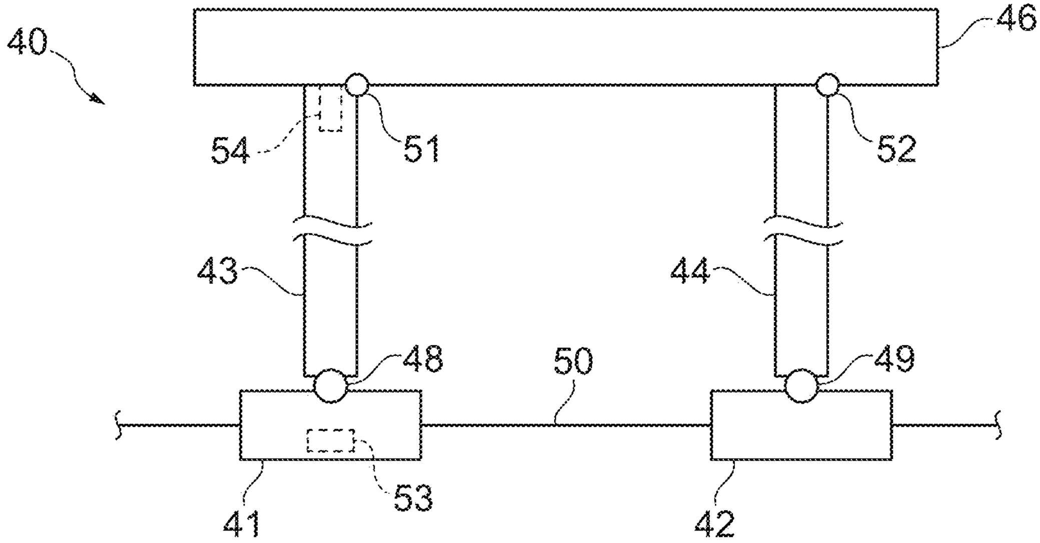
FIG. 4 is a schematic side view that shows a tarp in a used state.
Figure 5:
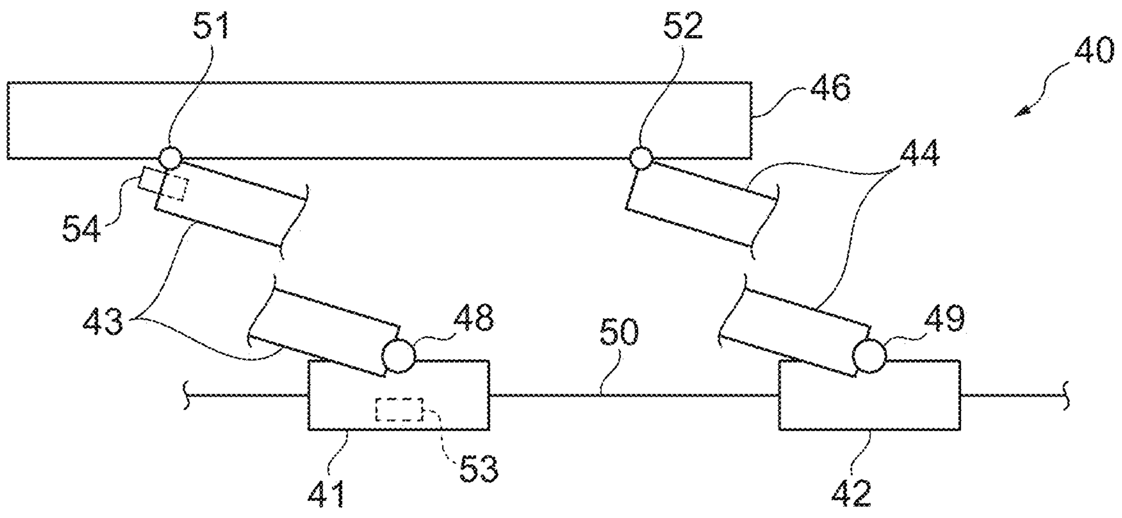
FIG. 5 is a schematic side view that shows the tarp in an unused state.

FIG. 4 is a schematic side view that shows the tarp 40 in the used state, and FIG. 5 is a schematic side view that shows the tarp 40 in the unused state.

The tarp 40 is attached to the hull 12 by attaching and fixing the attachment portions 41 and 42 to a gunwale 50 on the side of the hull 12 by using a fixing tool or the like. A state, in which the attachment portions 41 and 42 are fixed to the gunwale 50, is referred to as "an attached state" of the tarp 40. The pole 43 is connected to the attachment portion 41 by a connecting portion 48 such as a ball joint, and the pole 44 is connected to the attachment portion 42 by a connecting portion 49 such as a ball joint. Therefore, the pole 43 is relatively rotatable with respect to the attachment portion 41, and the pole 44 is relatively rotatable with respect to the attachment portion 42.

An upper end portion of the pole 43 farthest away from the attachment portion 41 is connected to the winding portion 46 by a connecting portion 51 such as a ball joint, and an upper end portion of the pole 44 farthest away from the attachment portion 42 is connected to the winding portion 46 by a connecting portion 52 such as a ball joint. Therefore, the pole 43 is relatively rotatable with respect to the winding portion 46, and the pole 44 is relatively rotatable with respect to the winding portion 46.

The poles 43 and 44 are rotatable substantially in the front-and-rear direction with the connecting portions 48 and 49 and the connecting portion portions 51 and 52 as rotation axes. As a result, the winding portion 46 and the gunwale 50 are displaced toward or away from each other while remaining substantially parallel to each other.

It should be noted that the method of fixing the attachment portions 41 and 42 to the gunwale 50 does not matter. In addition, it is not essential that the awning 47 is configured to be able to be wound. That is, "the used state", "the unused state", and "the attached state" are not limited to the exemplified states described above.

A first sensor 53 is provided on the attachment portion 41. The first sensor 53 detects that the attachment portion 41 is fixed to the gunwale 50 and outputs a detection signal. The first sensor 53 includes, for example, a mechanical switch, which is turned off before the attachment portion 41 is attached to the gunwale 50 and is turned on by being pressed by the gunwale 50 when the attachment portion 41 is attached to the gunwale 50. When the first sensor 53 outputs an ON detection signal (the detection signal), it is detected that the tarp 40 is in the attached state.

In addition, a second sensor 54 is provided at the upper end portion of the pole 43. The second sensor 54 detects that the pole 43 is upright and becomes vertical with respect to a longitudinal direction of the winding portion 46, and outputs a detection signal. The second sensor 54 includes, for example, a mechanical switch, which is turned off when the pole 43 is tilted, and is turned on by being pressed by the winding portion 46 when the pole 43 is upright. When the second sensor 54 outputs an ON detection signal (the detection signal), it is detected that the tarp 40 is in the used state.

The configurations of the first sensor 53 and the second sensor 54 are not limited, for example, the first sensor 53 and the second sensor 54 may be optical or magnetic sensors. It should be noted that the first sensor 53 may be provided on the gunwale 50 and the second sensor 54 may be provided on the winding portion 46. Alternatively, the first sensor 53 may be provided on the attachment portion 42 and the second sensor 54 may be provided on the pole 44.

Figure 6:
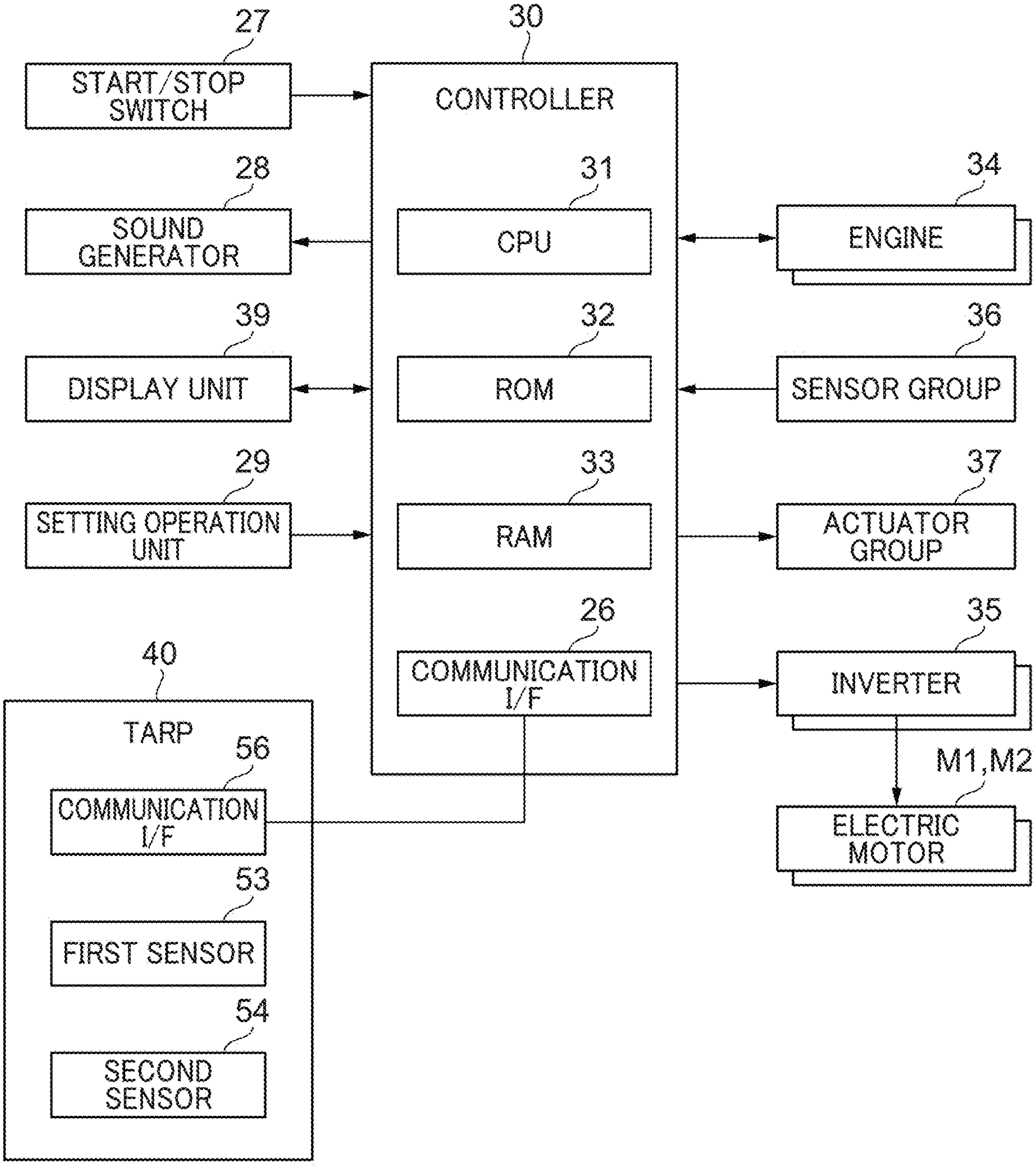
FIG. 6 is a block diagram of a marine vessel maneuvering system included in the marine vessel according to the first preferred embodiment of the present invention.

FIG. 6 is a block diagram of a marine vessel maneuvering system included in the marine vessel 11. As components mainly related to marine vessel maneuvering, in addition to the steering handle 17 and the output adjusting unit 18 that are described above, the marine vessel maneuvering system includes a controller 30, a display unit 39, a setting operation unit 29, a start/stop switch 27, a sound generator 28, the two engines 34, a sensor group 36, an actuator group 37, and two inverters 35. The engine 34 is included in each of the first propulsion units 14. The electric motors M are included in each of the second propulsion units 15. The inverter 35 is provided for each of the electric motors M. In addition, the tarp 40 includes a communication I/F (interface) 56 in addition to the first sensor 53 and the second sensor 54 (see FIG. 4).

The controller 30 includes a CPU (Central Processing Unit) 31, a ROM (Read Only Memory) 32, a RAM (Random Access Memory) 33, a communication I/F 26, and a timer (not shown). The ROM 32 stores control programs. The CPU 31 realizes various kinds of control processes by executing the control programs, which are stored in the ROM 32, in the RAM 33. The RAM 33 provides a working area for the CPU 31 to execute the control programs. The controller 30 functions as a main ECU and controls the engine ECU of the first propulsion unit 14 and the motor ECU of the second propulsion unit 15.

The communication I/F 26 communicates with the communication I/F 56 of the tarp 40. Communication standards of the communication I/F 26 and the communication I/F 56 do not matter, and may be wireless or wired. The controller 30 receives detection results from the first sensor 53 and the second sensor 54 via the communication I/F 26. The controller 30, which functions as a judging unit, judges that the tarp 40 is in the attached state (i.e., judges that the tarp 40 is attached to the hull 12) when receiving the ON detection result from the first sensor 53. Further, the controller 30 judges that the tarp 40 is in the used state when receiving the ON detection result from the second sensor 54.

It should be noted that in the case that the communication I/F 26 and the communication I/F 56 are connected by wired communication, when the attachment portion 41 is attached to the gunwale 50, they may be electrically connected to each other, and the wired communication between the communication I/F 26 and the communication I/F 56 may be established. Furthermore, when the wired connection between the communication I/F 26 and the communication I/F 56 is established, the controller 30 may judge that the tarp 40 is attached to the hull 12. In the case of judging whether or not the tarp 40 is attached based on the establishment of the wired connection between the communication I/F 26 and the communication I/F 56, the first sensor 53 may be eliminated.

The controller 30 causes the marine vessel 11 to be propelled by at least one of the first propulsion units 14 and the second propulsion units 15. The marine vessel operator is able to choose one of several marine vessel maneuvering modes by operating the setting operation unit 29. The marine vessel maneuvering modes include a mode in which either one of the first propulsion units 14 or the second propulsion units 15 is used, and a mode in which both the first propulsion units 14 and the second propulsion units 15 are used.

The display unit 39 displays various kinds of information. The setting operation unit 29 includes an operation element (not shown) to perform operations related to the marine vessel maneuvering, a setting operation element (not shown) to perform various kinds of settings, and an input operation element (not shown) to input various kinds of instructions. The sound generator 28 includes a speaker, etc., and generates a sound such as the sound of a message or a warning sound.

The sensor group 36 includes a steering angle sensor (not shown), a lever position sensor (not shown), a hull speed sensor (not shown), a hull acceleration sensor (not shown), an attitude sensor (not shown), an engine rotation number sensor (not shown), and the like. Various kinds of detection results obtained by the sensor group 36 are supplied to the controller 30.

In the sensor group 36, the hull speed sensor and the hull acceleration sensor detect a speed and an acceleration of navigation of the marine vessel 11 (the hull 12), respectively. The attitude sensor includes, for example, a gyro sensor, a magnetic azimuth sensor, etc. The engine rotation number sensor detects the number of rotations per unit time (a rotation number per unit time) of the engine 34. The steering angle sensor detects a rotation angle of the steering handle 17 when the steering handle 17 is rotated. The lever position sensor detects a shift position of the output adjusting unit 18.

The actuator group 37 includes actuators that drive deflectors (not shown) provided within the first propulsion units 14 and the second propulsion units 15 and the buckets provided within the first propulsion units 14. The deflectors are components to change a direction of a jet flow to the left or right.

The start/stop switch 27 is provided near the maneuvering seat. When the start/stop switch 27 is pressed within a certain period of time (a predetermined period of time), the marine vessel maneuvering system is activated and various kinds of meter displays are also started. However, the engines 34 are not started. The engines 34 are started when the start/stop switch 27 is kept pressed for the certain period of time (the predetermined period of time) or more.

In such a configuration, the controller 30 controls the engines 34 and the electric motors M based on the shift position of the output adjusting unit 18 detected by the lever position sensor. The controller 30 determines the rotation direction of the electric motors M depending on the shift position of the output adjusting unit 18. Further, the controller 30 determines an indicated speed in response to the shift position (an operation amount) of the output adjusting unit 18, and controls the rotational speed of the electric motors M by using the inverters 35 and according to the indicated speed.

Figure 7:
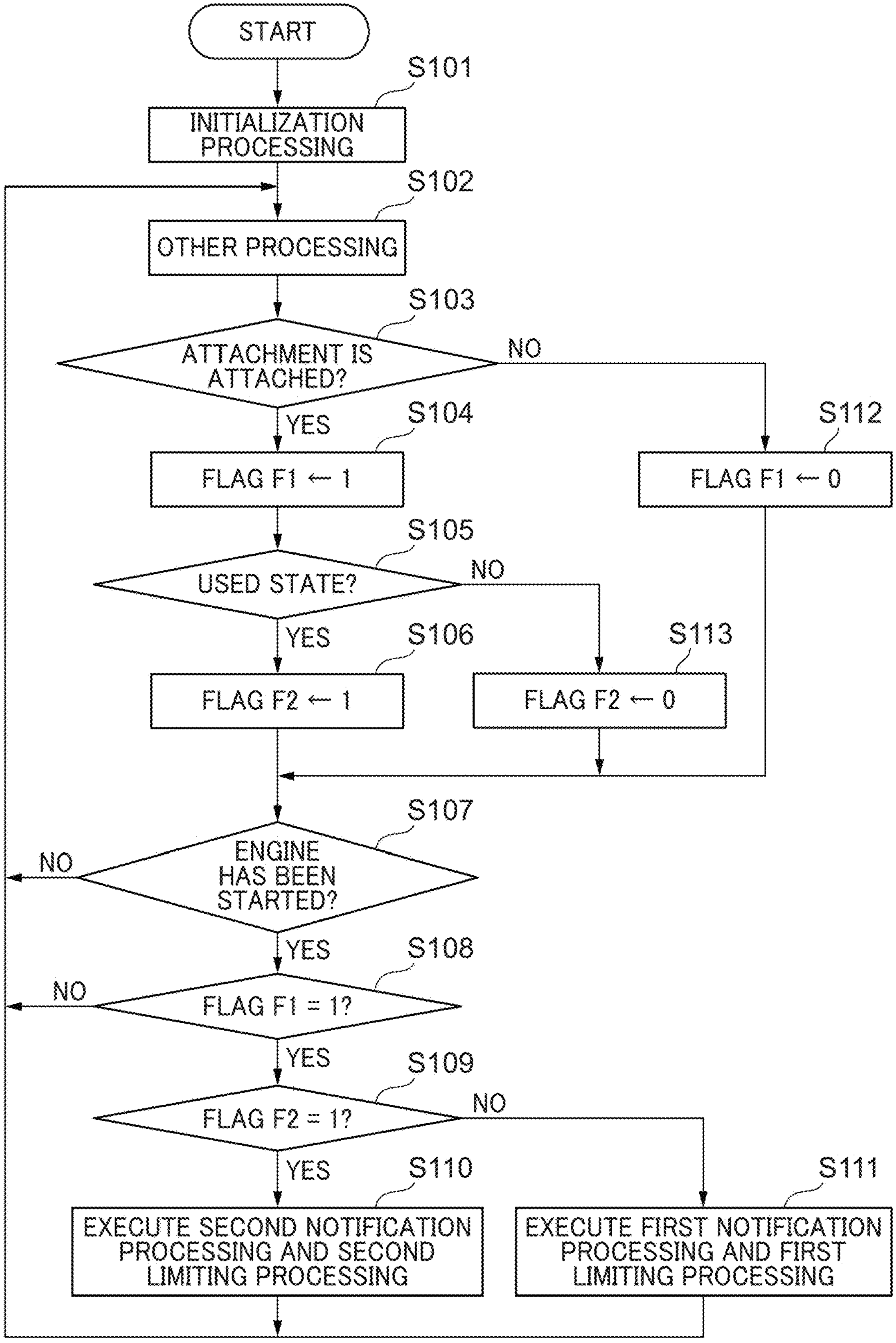
FIG. 7 is a flowchart that shows the flow of an attachment handling process.

FIG. 7 is a flowchart that shows the flow of an attachment handling process. The attachment handling process is realized by the CPU 31 expanding the control program, which is stored in the ROM 32, to the RAM 33 and executing the control program. The attachment handling process is started in response to activation of the marine vessel maneuvering system.

First, in a step S101, the CPU 31 executes an initialization process. In the initialization process, a flag F1 and a flag F2 are initialized to 0. The flag F1 is a flag indicating that the tarp 40 is in the attached state when it is "1". In addition, the flag F2 is a flag indicating that the tarp 40 is in the used state when it is "1". In a step S102, the CPU 31 executes other processes. In the other processes, the CPU 31 executes a process such as ending the attachment handling process in response to the instruction from the user (the marine vessel operator).

In a step S103, the CPU 31 judges whether or not the attachment (here, the tarp 40) is attached. As described above, in the case that the CPU 31 receives the ON detection signal from the first sensor 53, the CPU 31 judges that the tarp 40 is in the attached state. In the case that the result of judging in the step S103 is that the tarp 40 is not in the attached state, in a step S112, the CPU 31 sets the flag F1 to 0, and advances the attachment handling process to a step S107. On the other hand, in the case that the result of judging in the step S103 is that the tarp 40 is in the attached state, in a step S104, the CPU 31 sets the flag F1 to 1, and advances the attachment handling process to a step S105.

In the step S105, the CPU 31 judges whether or not the tarp 40 is in the used state. As described above, in the case that the CPU 31 receives the ON detection signal from the second sensor 54, the CPU 31 judges that the tarp 40 is in the used state. In the case that the result of judging in the step S105 is that the tarp 40 is not in the used state, in a step S113, the CPU 31 sets the flag F2 to 0, and advances the attachment handling process to the step S107. On the other hand, in the case that the result of judging in the step S105 is that the tarp 40 is in the used state, in a step S106, the CPU 31 sets the flag F2 to 1, and advances the attachment handling process to the step S107.

In the step S107, the CPU 31 judges whether or not the engines 34 have been started. In the case of judging that the engines 34 have not been started, the CPU 31 returns the attachment handling process to the step S102. On the other hand, in the case of judging that the engines 34 have been started, in a step S108, the CPU 31 judges whether or not the flag F1=1 (that is, judges whether or not the tarp 40 is in the attached state). In the case of judging that the flag F1 is not 1, the CPU 31 returns the attachment handling process to the step S102. On the other hand, in the case of judging that the flag F1 is 1 (the flag F1=1), the CPU 31 advances the attachment handling process to a step S109.

In the step S109, the CPU 31 judges whether or not the flag F2=1 (that is, judges whether or not the tarp 40 is in the used state). In the case of judging that the flag F2 is 1 (the flag F2=1), the CPU 31 advances the attachment handling process to a step S110. On the other hand, in the case of judging that the flag F2 is not 1, the CPU 31 advances the attachment handling process to a step S111.

In the step S111, the CPU 31, which also functions as a notifying unit and a control unit, executes a first notification process and a first limiting process. After the step S111, the CPU 31 returns the attachment handling process to the step S102. In the step S110, the CPU 31, which function as the notifying unit and the control unit, executes a second notification process and a second limiting process. After the step S110, the CPU 31 returns the attachment handling process to the step S102.

Here, examples of the notification process (the first notification process, the second notification process) and the limiting process (the first limiting process, the second limiting process) will be described. It should be noted that the limiting process is a process of limiting a function related to navigation of the hull 12, and detailed examples thereof will be described below.

In the notification process, the CPU 31 executes the notification process in a mode in response to the state of the tarp 40, and executes the notification process in a different mode depending on whether the tarp 40 is in the used state or the tarp 40 is in the unused state. For example, in the first notification process executed in the step S111 in the case that the tarp 40 is in the unused state, the CPU 31 notifies that the attachment (the accessory) is attached and that the function is limited by the first limiting process.

In the second notification process executed in the step S110 in the case that the tarp 40 is in the used state, the CPU 31 notifies that the attachment (the accessory) is in the used state and that the function is limited by the second limiting process. Although the method of notification is not limited, for example, in addition to displaying a message or a mark on the display unit 39, a warning sound or the like may be generated by the sound generator 28. It should be noted that it may be notified by at least one of a sound or a display.

In the limiting process, in the case that the tarp 40 is in the used state, the CPU 31 limits the function related to navigation of the hull 12 more than in the case that the tarp 40 is in the unused state. For example, in the first limiting process executed in the step S111 in the case that the tarp 40 is in the unused state, the CPU 31 limits a maximum speed of the hull 12 to a predetermined percentage (for example, 70%) of a specified maximum speed. It should be noted that at least one of the maximum speed or a maximum acceleration of the hull 12 may be limited.

In the second limiting process executed in the step S110 in the case that the tarp 40 is in the used state, the CPU 31 limits the maximum speed of the hull 12 to a predetermined low speed (for example, 10 k/h). The predetermined low speed is a value lower (slower) than the maximum speed in the first limiting process. It should be noted that in the second limiting process, at least one of the maximum speed or the maximum acceleration of the hull 12 may be made lower than in the case of the first limiting process.

It should be noted that in the limiting process, a maximum rotation number of the driving source (the engines 34 or the electric motors M) may be limited. For example, in the case of navigating by using the engines 34, the rotation number per unit time of the engine 34 may be limited to a predetermined rotation number or less. As an example, in the case of the second limiting process, the maximum rotation number of the engine 34 is set to 2000 rpm. Alternatively, a maximum opening of a throttle in the engine 34 may be limited to a predetermined opening or less. Furthermore, in the case of navigating by using the electric motors M, the rotation number per unit time of the electric motor M may be limited to a predetermined rotation number or less. It should be noted that the values of the predetermined rotation number and the maximum opening of the throttle are set to lower values in the case of the second limiting process than in the case of the first limiting process.

Thus, the reason why the first limiting process is executed in the case that the tarp 40 is in the attached state (and in the unused state) is that navigating while the tarp 40 is attached (and is in the unused state) may change the feeling of the marine vessel maneuvering and the navigation performance, and the marine vessel operator may have an unusual or uncomfortable feeling. Furthermore, the reason why the second limiting process is executed in the case that the tarp 40 is in the used state is that the tendency as described above becomes stronger. Therefore, in the case that the tarp 40 is in the used state but the marine vessel 11 (the hull 12) is erroneously navigated, it is possible to relieve the unusual feeling of the marine vessel operator by limiting the maximum speed or the like of the hull 12, and it is possible to call the attention of the marine vessel operator (it is possible to alert the marine vessel operator) by notifying that the maximum speed or the like of the hull 12 is limited.

According to the first preferred embodiment of the present invention, in the case of being judged that the tarp 40 (the attachment), which is attachable and detachable, is attached to the hull 12, since it is notified to the vessel operator that the tarp 40 (the attachment) is attached to the hull 12, it is possible to inform the vessel operator that the attachment (the tarp 40) is attached.

In addition, in the case of being judged that the tarp 40 is attached, since the notification process is executed in response to the start of the engines 34 (the steps S107 to S111), it is possible to inform the marine vessel operator that the attachment (the tarp 40) is attached during navigation and call the attention of the marine vessel operator.

In addition, since the notification process is executed in a different mode (manner) depending on whether the tarp 40 is in the used state or the tarp 40 is in the unused state, it is possible to differentiate the level of alerting the vessel operator.

In addition, in the limiting process, by limiting at least one of the maximum speed or the maximum acceleration of the hull 12, it is possible to reduce a change in the feeling of the marine vessel maneuvering and a change the navigation performance.

In addition, in the limiting process, limiting of the maximum speed of the hull 12, the maximum acceleration of the hull 12, the engine rotation number, the throttle opening, and the motor rotation number is exemplified as described above, but not limited to these examples. For example, a steering angle or the like may be limited.

It should be noted that the step S107 in FIG. 7 may be eliminated. That is, when the tarp 40 is in the attached state (when the flag F1=1), the first notification process and the first limiting process may be executed without waiting for the engines 34 to start. Further, in such a case, in the first limiting process, starting of the driving source such as the engines 34 may be prohibited.

Next, a second preferred embodiment of the present invention will be described. In the second preferred embodiment of the present invention, an expansion deck is exemplified as the attachment, which is attachable and detachable.

Figure 8:
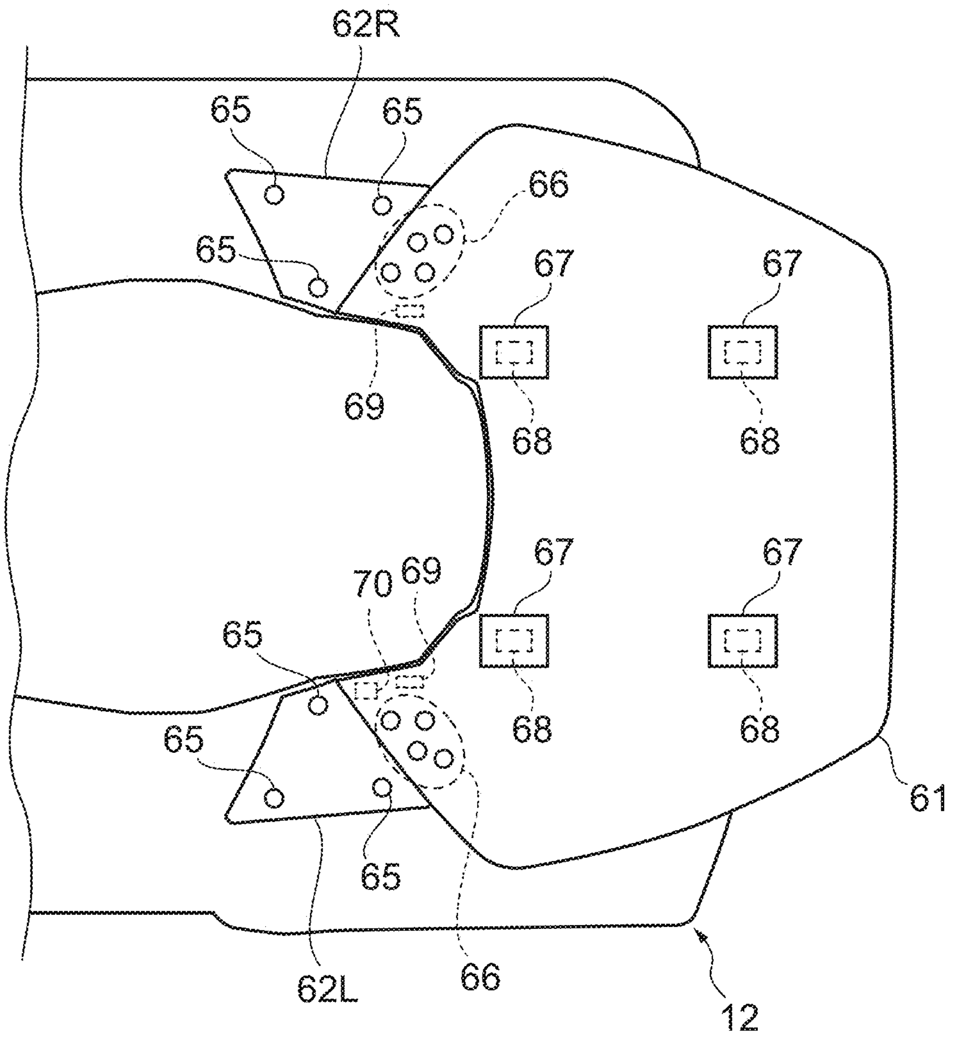
FIG. 8 is a schematic top view of a rear portion of a hull to which an expansion deck is attached according to a second preferred embodiment of the present invention.
Figure 9:
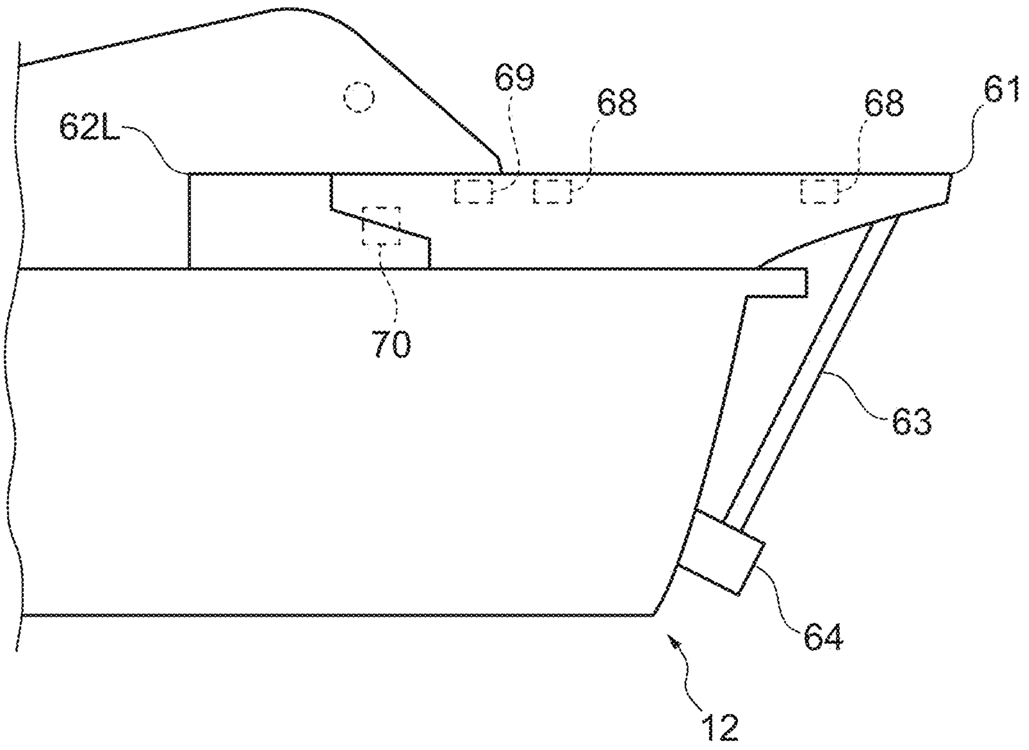
FIG. 9 is a schematic side view of the rear portion of the hull to which the expansion deck is attached.

FIG. 8 is a schematic top view of the rear portion of the hull 12, to which an expansion deck 61 is attached. FIG. 9 is a schematic side view of the rear portion of the hull 12, to which the expansion deck 61 is attached. The expansion deck 61 is an accessory that expands the area of the plane at the rear portion of the hull 12 (a rear platform), and is sometimes called a leisure deck. A person is able to board the expansion deck 61, e.g., sit or stand on the expansion deck 61.

The expansion deck 61 is attached and fixed to the hull 12 via left and right brackets 62L and 62R and a strut 63. As shown in FIG. 8, the brackets 62L and 62R are fixed to the hull 12 with a plurality of fixing tools 65, and the expansion deck 61 is fixed to the brackets 62L and 62R with a plurality of fixing tools 66. Furthermore, as shown in FIG. 9, a bracket 64 provided on the hull 12 and the lower rear portion of the expansion deck 61 are connected by the strut 63 so as to support the rear portion of the expansion deck 61.

A third sensor 70 is provided on the expansion deck 61. The configuration of the third sensor 70 is not limited, but for example, is similar to that of the first sensor 53 (see FIGS. 4 and 5). Therefore, the third sensor 70 detects that the expansion deck 61 is fixed to the bracket 62L and outputs a detection signal. When the third sensor 70 outputs an ON detection signal (the detection signal), it is detected that the expansion deck 61 is in the attached state (it is detected that the expansion deck 61 is attached to the hull 12). It should be noted that the third sensor 70 may be provided to at least one of the brackets 62L and 62R.

The upper surface of the expansion deck 61 is provided with a plurality of mounting portions 67 to mount chairs or the like. A fourth sensor 68 is provided on each of the mounting portions 67. The fourth sensor 68 includes, for example, a sensor using a piezoelectric element, and outputs a signal corresponding to a pressing force. When the fourth sensor 68 outputs a signal having a certain level or higher, it is detected that a person has boarded the expansion deck 61. When a person has boarded the expansion deck 61 it is regarded that the expansion deck 61 is in the used state.

In addition, a human detection sensor 69 may be provided on the expansion deck 61. The human detection sensor 69 includes, for example, a sensor that emits infrared light, and detects the presence or absence of an object such as a person. It should be noted that the human detection sensor 69 may be provided on the hull 12.

Figure 10:
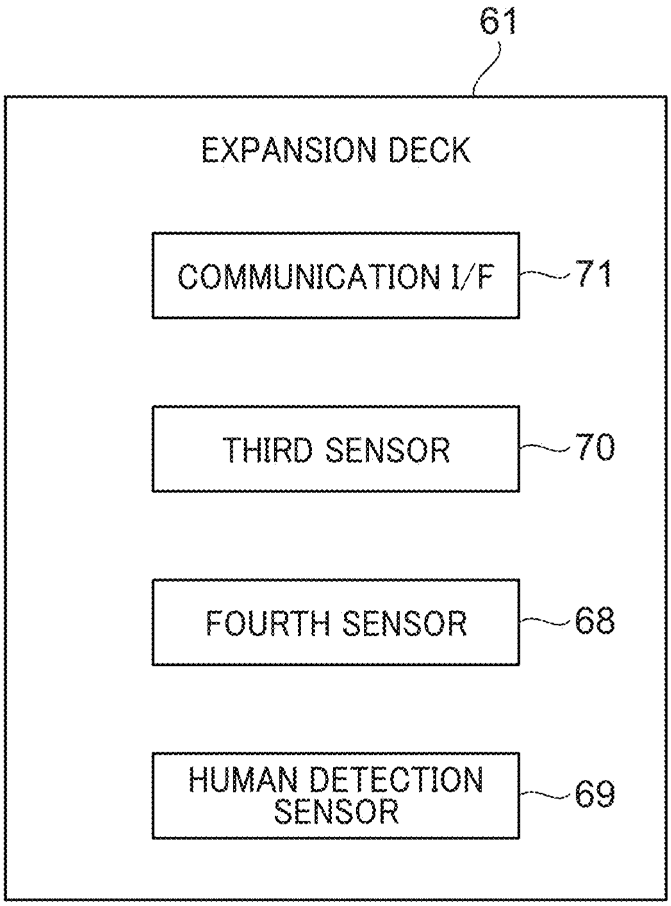
FIG. 10 is a block diagram of the expansion deck.

FIG. 10 is a block diagram of the expansion deck 61. The expansion deck 61 includes the third sensor 70, the fourth sensor 68, the human detection sensor 69, and a communication I/F 71. The configuration of the communication I/F 71 is similar to that of the communication I/F 56 (see FIG. 6). The communication I/F 26 of the controller 30 communicates with the communication I/F 71 of the expansion deck 61.

The controller 30 obtains detection results from the third sensor 70 and the fourth sensor 68 via the communication I/F 26. The controller 30 judges that the expansion deck 61 is attached to the hull 12 when receiving the ON detection result from the third sensor 70. Further, the controller 30 judges that a person has boarded the expansion deck 61 (a person is on the expansion deck 61) when receiving the ON detection result from the fourth sensor 68. It should be noted that when judging whether or not a person is on the expansion deck 61, the human detection sensor 69 may be used in place of the fourth sensor 68, or both the human detection sensor 69 and the fourth sensor 68 may be used together.

It should be noted that in the case that the communication I/F 26 and the communication I/F 70 are connected by wired communication, when the expansion deck 61 is attached to the bracket 62L, they may be electrically connected to each other, and the wired communication between the communication I/F 26 and the communication I/F 70 may be established. Furthermore, when the wired connection between the communication I/F 26 and the communication I/F 70 is established, the controller 30 may judge that the expansion deck 61 is attached to the hull 12. In the case of judging whether or not the expansion deck 61 is attached based on the establishment of the wired connection between the communication I/F 26 and the communication I/F 70, the third sensor 70 may be eliminated.

In addition, an imaging unit may be provided as a human detection sensor. It should be noted that the brackets 62L and 62R may be integral with the expansion deck 61. In such a case, a sensor that detects the fixed state between the hull 12 and the expansion deck 61 may be provided instead of the third sensor 70.

In an attachment handling process (see FIG. 7) according to the second preferred embodiment of the present invention, in the step S103, the CPU 31 judges whether or not the attachment (here, the expansion deck 61) is attached. As described above, in the case that the CPU 31 receives the ON detection signal from the third sensor 70, the CPU 31 judges that the expansion deck 61 is in the attached state.

In the step S105, the CPU 31 judges whether or not a person is on the expansion deck 61. As described above, in the case that the CPU 31 receives the ON detection signal from the fourth sensor 68, the CPU 31 judges that a person is on the expansion deck 61.

In the steps S111 and S110, the CPU 31 executes the notification process and the limiting process in different modes depending on whether a person is on the expansion deck 61 or a person is not on the expansion deck 61. The contents of the notification process and the limiting process executed in the steps S111 and S110 are similar to that of the first preferred embodiment of the present invention. For example, in the case of being judged that a person is on the expansion deck 61, the CPU 31 limits the function related to navigation of the hull 12 more than in the case of being judged that a person is not on the expansion deck 61. By doing so, in the case that a person is on the expansion deck 61 but the marine vessel 11 (the hull 12) is erroneously navigated, as with the first preferred embodiment of the present invention, it is possible to relieve the unusual feeling of the marine vessel operator by limiting the maximum speed or the like of the hull 12, and it is possible to call the attention of the marine vessel operator (it is possible to alert the marine vessel operator) by notifying the vessel operator that the maximum speed or the like of the hull 12 is limited.

According to the second preferred embodiment of the present invention, it is possible to obtain the same effects as the first preferred embodiment of the present invention in terms of informing the vessel operator that the attachment is attached.

Although the present invention has been described in detail based on the preferred embodiments above, the present invention is not limited to these specific preferred embodiments, and various preferred embodiments within the scope of the gist of the present invention are also included in the present invention. Some of the above-described preferred embodiments may be combined as appropriate.

For example, the attachment handling process (see FIG. 7) may be executed for each of the tarp 40 and the expansion deck 61. That is, when at least one of the tarp 40 or the expansion deck 61 is attached, the first notification process and the first limiting process may be executed, and when at least one of the tarp 40 or the expansion deck 61 becomes in the used state (or the state in which a person is on the expansion deck 61), the second notification process and the second limiting process may be executed.

It should be noted that the attachment, which is able to be attached and detached to and from the hull 12, is not limited to the tarp 40 or the expansion deck 61. In particular, the attachment may be an object that is visible as a portion of an external appearance when the hull 12 is viewed from a horizontal direction, or an object that may come into contact with a surface of the water during navigation. This is because such attachments (objects) have a high possibility of affecting the change in the feeling of the marine vessel maneuvering and the change the navigation performance.

It should be noted that the marine vessel 11 does not necessarily have to be a hybrid type marine vessel that includes the propulsion units 14 and 15, and may be a marine vessel that includes either the first propulsion units 14 or the second propulsion units 15. In addition, the present invention is also applicable to a marine vessel that includes one first propulsion unit 14 or one second propulsion unit 15. In addition, the present invention is applicable not only to PWCs (personal watercrafts) and water bikes, but also to various types of marine vessels propelled by outboard motors, inboard motors, or inboard/outboard motors, to and from which attachments are able to be attached/detached.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel comprising:
- a hull;
- a detector to detect that an attachment attachable to and detachable from the hull is attached to the hull; and
- a controller configured or programmed to function as:
  - a judging unit to judge whether or not the attachment is attached to the hull based on a detection result from the detector; and
  - a notifying unit to, in a case of being judged by the judging unit that the attachment is attached, execute a notification process to notify a vessel operator that the attachment is attached to the hull; wherein
- in the case of being judged that the attachment is attached, the judging unit is configured or programmed to further judge a state of the attachment; and
- the notifying unit is configured or programmed to execute the notification process in a mode corresponding to the judged state.

2. The marine vessel according to claim 1, wherein, in the case of being judged that the attachment is attached, the notifying unit is configured or programmed to execute the notification process in response to a start of a propulsion device that applies a thrust to the hull.

3. The marine vessel according to claim 1, wherein the notifying unit is configured or programmed to execute the notification process by at least one of a sound or a display.

4. The marine vessel according to claim 1, wherein
- the state of the attachment is whether the attachment is in a used state or in an unused state; and
- the notifying unit is configured or programmed to execute the notification process in a different mode depending on whether the attachment is in the used state or in the unused state.

5. The marine vessel according to claim 1, wherein the controller is further configured or programmed to function as a control unit to, in the case of being judged by the judging unit that the attachment is attached, execute a limiting process to limit a function related to navigation of the hull.

6. The marine vessel according to claim 5, wherein, in the limiting process, the control unit is configured or programmed to limit at least one of a maximum speed or a maximum acceleration of the hull.

7. The marine vessel according to claim 5, further comprising:
- a propulsion device to apply a thrust to the hull and including a driving source; and
- in the limiting process, the control unit is configured or programmed to limit a maximum rotation number of the driving source.

8. The marine vessel according to claim 5, further comprising:
- a propulsion device to apply a thrust to the hull and including an engine; and
- in the limiting process, the control unit is configured or programmed to limit a maximum opening of a throttle in the engine.

9. The marine vessel according to claim 5, wherein
- in the case of being judged that the attachment is attached, the judging unit is configured or programmed to further judge whether the state of the attachment is a used state or an unused state; and
- in the limiting process, in a case that the state of the attachment is the used state, the control unit is configured or programmed to limit the function more than in a case that the state of the attachment is the unused state.

10. The marine vessel according to claim 5, wherein
- in the limiting process, the control unit is configured or programmed to limit at least one of a maximum speed or a maximum acceleration of the hull; and
- in the limiting process, in a case that the state of the attachment is a used state, the control unit is configured or programmed to cause at least one of the maximum speed or the maximum acceleration of the hull to be lower than in a case that the state of the attachment is an unused state.

11. The marine vessel according to claim 1, wherein
- the attachment is an object on which a person is able to board;
- in the case of being judged that the attachment is attached, the judging unit is configured or programmed to further judge whether or not a person is on the attachment; and
- the notifying unit is configured or programmed to execute the notification process in different modes in a case of being judged that a person is on the attachment and a case of being judged that a person is not on the attachment.

12. The marine vessel according to claim 11, wherein the controller is further configured or programmed to function as a control unit to, in the case of being judged by the judging unit that the attachment is attached, execute a limiting process to limit a function related to navigation of the hull; and in the limiting process, in the case of being judged that a person is on the attachment, the control unit is configured or programmed to limit the function more than in the case of being judged that a person is not on the attachment.

13. The marine vessel according to claim 11, wherein the attachment is attachable and detachable to and from a rear portion of the hull.

14. The marine vessel according to claim 11, wherein the attachment expands an area at a rear portion of the hull.

15. The marine vessel according to claim 12, wherein in the limiting process, the control unit is configured or programmed to limit at least one of a maximum speed or a maximum acceleration of the hull; and in the limiting process, in the case of being judged that a person is on the attachment, the control unit is configured or programmed to cause at least one of the maximum speed or the maximum acceleration of the hull to be lower than in the case of being judged that a person is not on the attachment.

16. The marine vessel according to claim 12, further comprising:

a propulsion device to apply a thrust to the hull and including a driving source; and in the limiting process, the control unit is configured or programmed to limit a maximum rotation number of the driving source.

17. The marine vessel according to claim 12, further comprising:

a propulsion device to apply a thrust to the hull and including an engine; and in the limiting process, the control unit is configured or programmed to limit a maximum opening of a throttle in the engine.

18. The marine vessel according to claim 1, wherein the attachment is an object that is visible when the hull is viewed from a horizontal direction, or an object to come into contact with a surface of the water during navigation.

* * * * *